United States Patent
Staub et al.

[19]

[11] Patent Number: 6,132,174
[45] Date of Patent: *Oct. 17, 2000

[54] TURBINE BLADE COOLING

[75] Inventors: Fred Wolf Staub, Schenectady; Fred Thomas Willett, Niskayuna, both of N.Y.

[73] Assignee: General Electric Company, Schenectady, N.Y.

[*] Notice: This patent is subject to a terminal disclaimer.

[21] Appl. No.: 09/258,222

[22] Filed: Feb. 26, 1999

Related U.S. Application Data

[63] Continuation of application No. 08/861,045, May 21, 1997, Pat. No. 5,924,843.

[51] Int. Cl.[7] ................................................ F01D 5/18
[52] U.S. Cl. .................................... 416/96 R; 415/115
[58] Field of Search .................................. 415/115, 116; 416/97 R, 96 R, 96 A, 95

[56] References Cited

U.S. PATENT DOCUMENTS

| | | | |
|---|---|---|---|
| 4,514,144 | 4/1985 | Lee | 416/97 R |
| 5,472,316 | 12/1995 | Taslim et al. | 416/97 R |
| 5,536,143 | 7/1996 | Jacala et al. | 416/97 R |
| 5,695,322 | 12/1997 | Jacobson et al. | 416/97 R |
| 5,738,493 | 4/1998 | Lee et al. | 416/97 R |
| 5,924,843 | 7/1999 | Staub et al. | 415/115 |

*Primary Examiner*—Edward K. Look
*Assistant Examiner*—Richard Woo
*Attorney, Agent, or Firm*—Patrick K. Patnode; Marvin Snyder

[57] ABSTRACT

A turbine rotor blade comprises a shank portion, a tip portion and an airfoil. The airfoil has a pressure side wall and a suction side wall that are interconnected by a plurality of partition sidewalls, defining an internal cooling passageway within the airfoil. The internal cooling passageway includes at least one radial outflow passageway to direct a cooling medium flow from the shank portion towards the tip portion and at least one radial inflow passageway to direct a cooling medium flow from the tip portion towards the shank portion. A number of mixing ribs are disposed on the partition sidewalls within the radial outflow passageways so as to enhance the thermal mixing of the cooling medium flow, thereby producing improved heat transfer over a broad range of the Buoyancy number.

17 Claims, 7 Drawing Sheets

TURBINE BLADE COOLING

This is a continuation of application Ser. No. 08/861,045, filed May 21, 1997, U.S. Pat. No. 5,924,843.

This invention was made with Government support under Government Contract No. DEAC2193MC30244 awarded by the Department of Energy (DOE). The Government has certain rights to this invention.

BACKGROUND OF THE INVENTION

This application relates to turbine blade passage cooling, and in particular relates to improvements in cooling performance of turbine blade passages over a range of buoyancy numbers.

The temperatures within gas turbines may exceed 2500 degrees Fahrenheit (1370° C.), and cooling of turbine blades is very important in terms of blade longevity. Without cooling, turbine blades would rapidly deteriorate. Improved cooling for turbine blades is very desirable, and much effort has been devoted by those skilled in the blade cooling arts to devise improved geometries for the internal cavities within turbine blades in order to enhance cooling.

Gas turbine blades have historically used compressor bleed air as the cooling medium to obtain acceptable service temperatures. Cooling passages associated with this design technology are typically serpentine arrangements along the mean camber line of the blades. The camber line is the locus of points between the low pressure and high pressure sides of the airfoil. Adjacent radial passages are connected alternately at the top and bottom by one hundred and eighty degree return U-bends to form either a single continuous passage, or independent serpentine passages, with the cooling air exiting into the gas path.

Each radial passage typically cools both the high pressure and low pressure sides of the blade airfoil. The specific geometry of each radial cooling passage is designed to balance the conflicting demands for low pressure drop and high heat transfer rate. Schemes used in the art to enhance heat transfer rate within the cooling passages include raised rib turbulence promoters, also known as trip strips or turbulators, passage crossover impingement, impingement inserts, and banks or rows of pins. These schemes increase the local turbulence in the flow and thus raise the rate of heat transfer.

Cooling schemes involving high pressure and high density fluids, such as steam, have been utilized. The use of steam as a coolant for gas turbine blade cooling can provide several advantages. One advantage is superior heat transfer. For example, when comparing typical high pressure extraction steam to compressor bleed air, steam has about a 70% advantage in heat transfer coefficient in turbulent duct flow by virtue of steam's higher density and higher specific heat.

Due to the large physical size of turbines, coupled with the use of high density cooling fluids, high centrifugal buoyancy effects occur in the cooling passages of the turbine blades. With air-cooled blades, undesirable buoyancy effects are typically small, Buoyancy number (Bo)<<1. The buoyancy effects are greater with steam, however, and as the buoyancy factor Bo exceeds about 0.1, the undesirable effects become increasingly significant. The internal coolant passages for a steam cooled system must therefore be designed to account for Coriolis and buoyancy effects, also known as secondary flow effects, explained in greater detail below.

More specifically, at the higher densities and low flow rates of steam, the cooling steam flow within the internal blade cooling passages is prone to develop secondary flows from Coriolis and centrifugal buoyancy forces. The occurrence of these secondary flows within the cooling passages affects the predictability of heat transfer and, more critically, impairs the heat transfer because of uneven heat pickup and flow reversal.

More specifically, as a typical blade rotates about a shaft axis, one side of the airfoil is always ahead of the other, in the direction of rotation. The convex side of the airfoil is called the suction side, the concave side is called the pressure side. The suction side of the airfoil always leads the pressure side of the airfoil in rotation. Inside the airfoil, when the cooling medium is in radial outflow, the flow in the center of the passage tends to move from the region of the cavity near the suction side to the region of the cavity near the pressure side, in the plane of the cavity cross-section. This flow then returns to the suction side along the heated passage walls, thus transporting heated coolant towards the suction side. (See FIG. 3) At the suction side, the local radial flow velocities are decreased, and can even be reversed in direction, when the bulk flow is in the radial outward direction, due to the large centrifugal buoyancy effect. Because high pressure steam is more dense than air, the body forces are higher when steam is the coolant, hence the tendency of the flow to migrate, in the cavity, from the suction side to the pressure side is greater. This migration within the cavity leads to low heat transfer coefficients on the suction side in radial outflow. In radial inflow passages the Coriolis induced flow is reversed in direction from that in radial outflow passages. Since the buoyancy effect causes the hotter fluid to further accelerate in the radial inward direction, the heat transfer coefficients are increased rather than decreased.

It has thus been determined that Coriolis and buoyancy forces or effects are most significant, with respect to the local heat transfer coefficients, in radial outflow cooling passages of a serpentine cooling circuit, particularly in the region from the pitchline (halfway between the hub and the tip of the blade) to the tip of the blade.

In current designs, the heat transfer coefficients in radial cooling passages with radial outflow of fluid are severely reduced over a range of Buoyancy numbers. In order to avoid the reduced performance region, fluid velocities are increased to reduce the Buoyancy number below about 0.10. This increase in fluid velocity, in turn, increases the required number of cooling passages and increases the passage pressure drop. Furthermore, there is a large change in heat transfer coefficient for a small change in fluid flow rate, meaning that small changes in coolant flow rate will produce large changes in metal temperature. A good design should be relatively insensitive to small changes in the coolant flow rate, so this condition should be avoided to achieve a more robust design.

Therefore, it is apparent from the above that there exists a need in the art for improvements in turbine blade cooling passages that increase cooling performance over a range of buoyancy numbers.

SUMMARY OF THE INVENTION

A turbine rotor blade comprises a shank portion, a tip portion and an airfoil. The airfoil has a pressure side wall and a suction side wall that are interconnected by a plurality of partition sidewalls, defining an internal cooling passageway within the airfoil. The internal cooling passageway includes at least one radial outflow passageway to direct a cooling medium flow from the shank portion towards the tip portion and at least one radial inflow passageway to direct a cooling medium flow from the tip portion towards the shank portion. A number of mixing ribs are disposed on the partition sidewalls within the radial outflow passageways so as to enhance the thermal mixing of the cooling medium flow, thereby producing improved heat transfer over a broad range of the Buoyancy number.

DETAILED DESCRIPTION OF THE INVENTION

Figure 1:
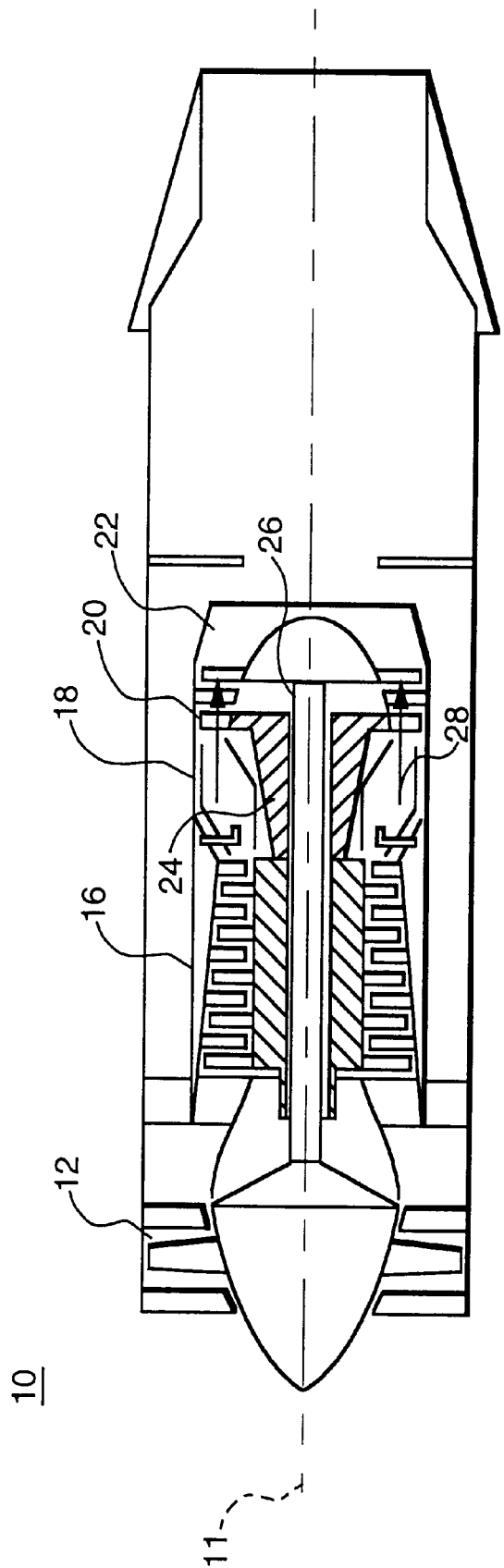
FIG. 1 is a cross-sectional plan view of a turbine engine in accordance with the instant invention.

A turbine engine 10, such as a gas turbine used for power generation or propulsion, is circumferentially disposed about an engine centerline 11, having in serial flow relationship a fan section 12, a high pressure compressor 16, a combustion section 18, a high pressure turbine 20, and a low pressure turbine 22, as shown in FIG. 1. In operation, the high pressure compressor 16 draws in fresh air and compresses the air. The air is admitted into the combustion chamber of combustion section 18. In combustion section 18, fuel is burned producing a very hot gas flow, (represented generally by arrow 28 of FIG. 1), with a temperature frequently greater than about 3900° F. (2150° C.). The gas flow is directed at a high velocity into turbine sections 20, 22, which turbine sections 20, 22 in turn harness the energy of the gas flow to drive turbine sections 20, 22 about respective axes of rotation. The use of the instant invention within turbine 10 is for illustrative purposes only and is not a limitation of the instant invention.

Figure 2:
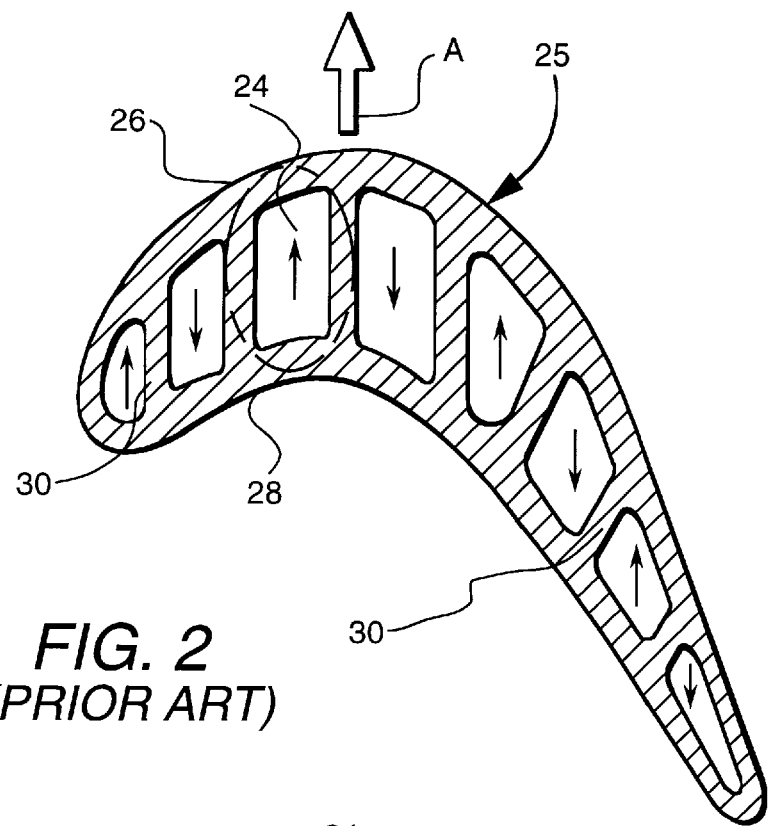
FIG. 2 is a section through a turbine blade with internal cooling passages.
Figure 3:
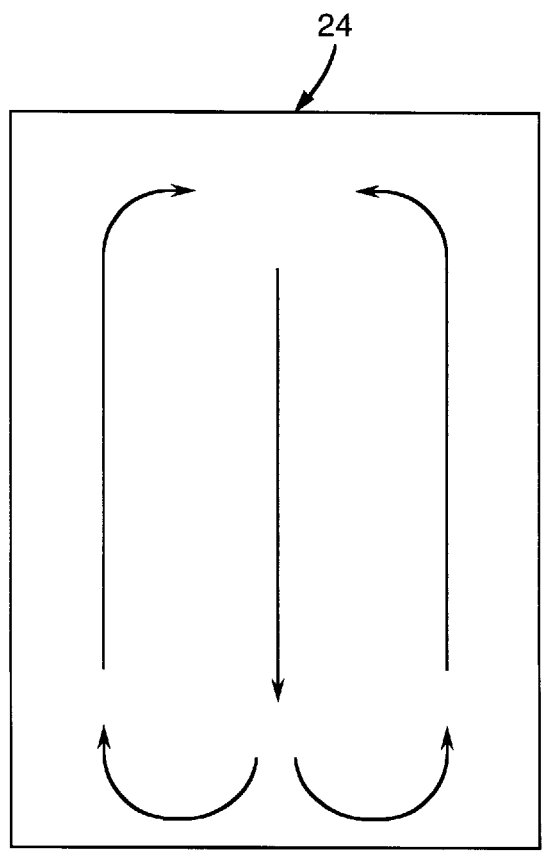
FIG. 3 is an enlarged, planar representation of a flow passage as shown in FIG. 2, generally illustrating secondary flow patterns.

Referring to FIGS. 2 & 3, a typical cooling passage 24 is shown in a blade 25 having a suction side 26 and a pressure side 28. The Coriolis induced secondary flow (assume rotation in the general direction of arrow "A", (FIG. 2)) transports cooler, higher momentum cooling medium from the core of passage 24 to pressure side 28 (See FIG. 3), where the radial velocity, the temperature gradient and the convective effects of the cooling medium are enhanced. Centrifugal buoyancy increases the radial velocity of the coolant near pressure side 28, further enhancing the convective effect. For suction side 26, however, the situation is just the opposite. Due to the Coriolis-induced secondary flow, the cooling medium exchanges heat with pressure side 28 and side walls 30 before reaching suction side 26. The fluid adjacent suction side 26 is warmer and the temperature gradient in the cooling medium is lower, weakening the convection effect. The warmer fluid adjacent suction side 26 is also decelerated due to centrifugal buoyancy effects, weakening the convection effect further. Buoyancy effects become stronger at high densities and low radial velocities (high Buoyancy numbers) such that flow reversal can occur adjacent suction side 26 of passage 24.

Figure 4:
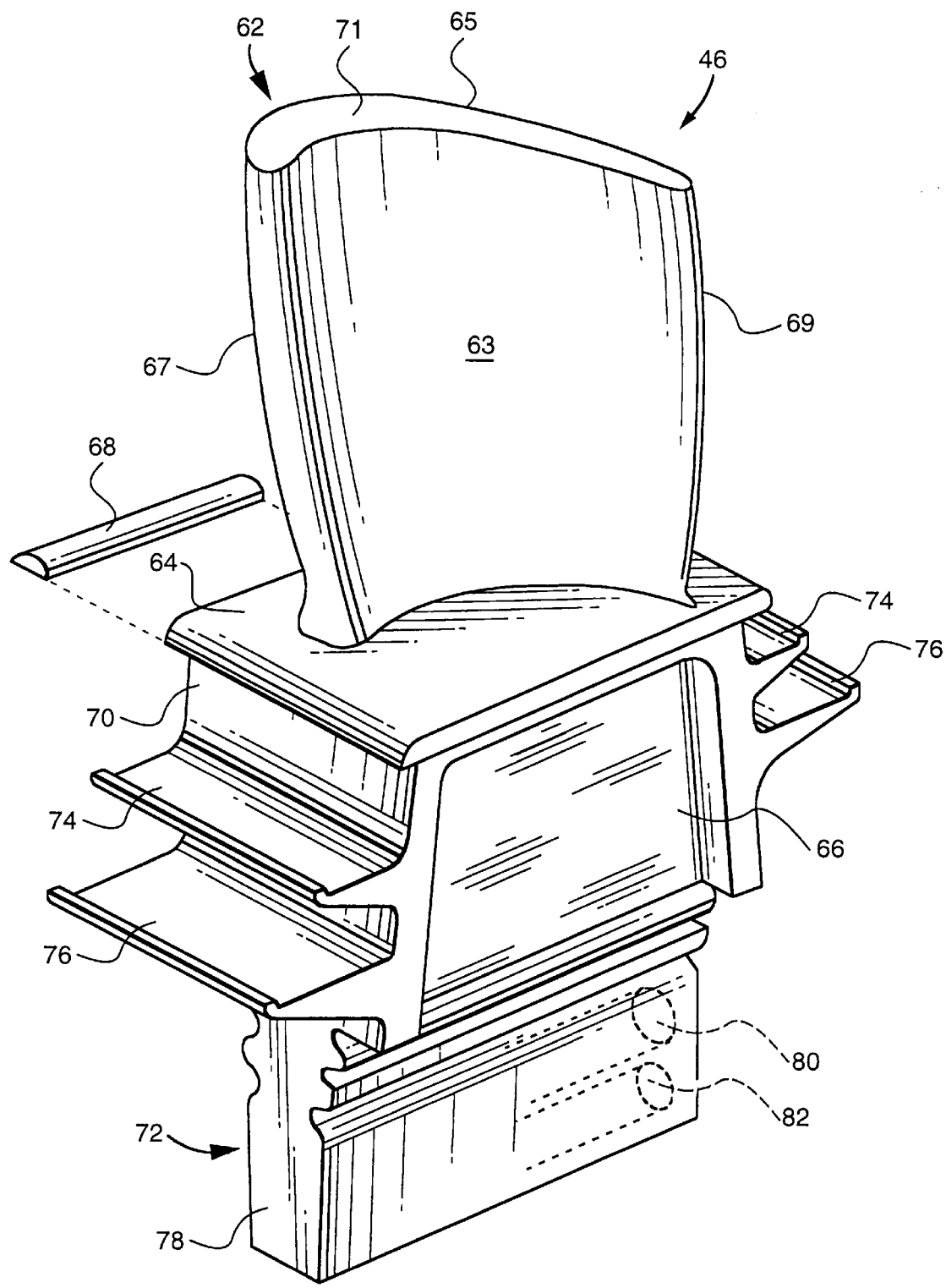
FIG. 4 is a perspective view of a turbine blade in accordance with the instant invention.

Referring now to FIG. 4, a gas turbine blade 46 is shown. Blade 46 comprises an airfoil 62 attached to a platform 64, which platform 64 seals a shank 66 of turbine blade 46 from the hot gas flow via a radial seal pin 68. Shank 66 is covered by two integral plates or skirts 70 to seal shank 66 from the wheelspace cavities via axial seal pins (not shown). Shank 66 is attached to the rotor disks by a dovetail attachment 72. Angel wing seals 74 and 76 provide sealing of the wheel-space cavities. Although the present invention is described herein in connection with blade 46, the present invention is not limited to practice in blade 46. The present invention can be implemented and utilized in connection with many other blade configurations. Therefore, it should be understood that blade 46 is merely an exemplary blade in which the present invention can be implemented and utilized.

Airfoil 62 extends outwardly into working medium flow path of the turbine where working medium gases, such as steam, can exert motive forces on the surfaces thereof. Airfoil 62 includes a pressure side wall 63 and a suction side wall 65 which are joined together at a leading edge 67 and a trailing edge 69. Blade 46 further includes a tip portion 71. For purposes of this document, the inward or inflow direction is defined as the direction toward dovetail attachment 72 and the outward or outflow direction is defined as the direction toward tip portion 71.

Figure 5:
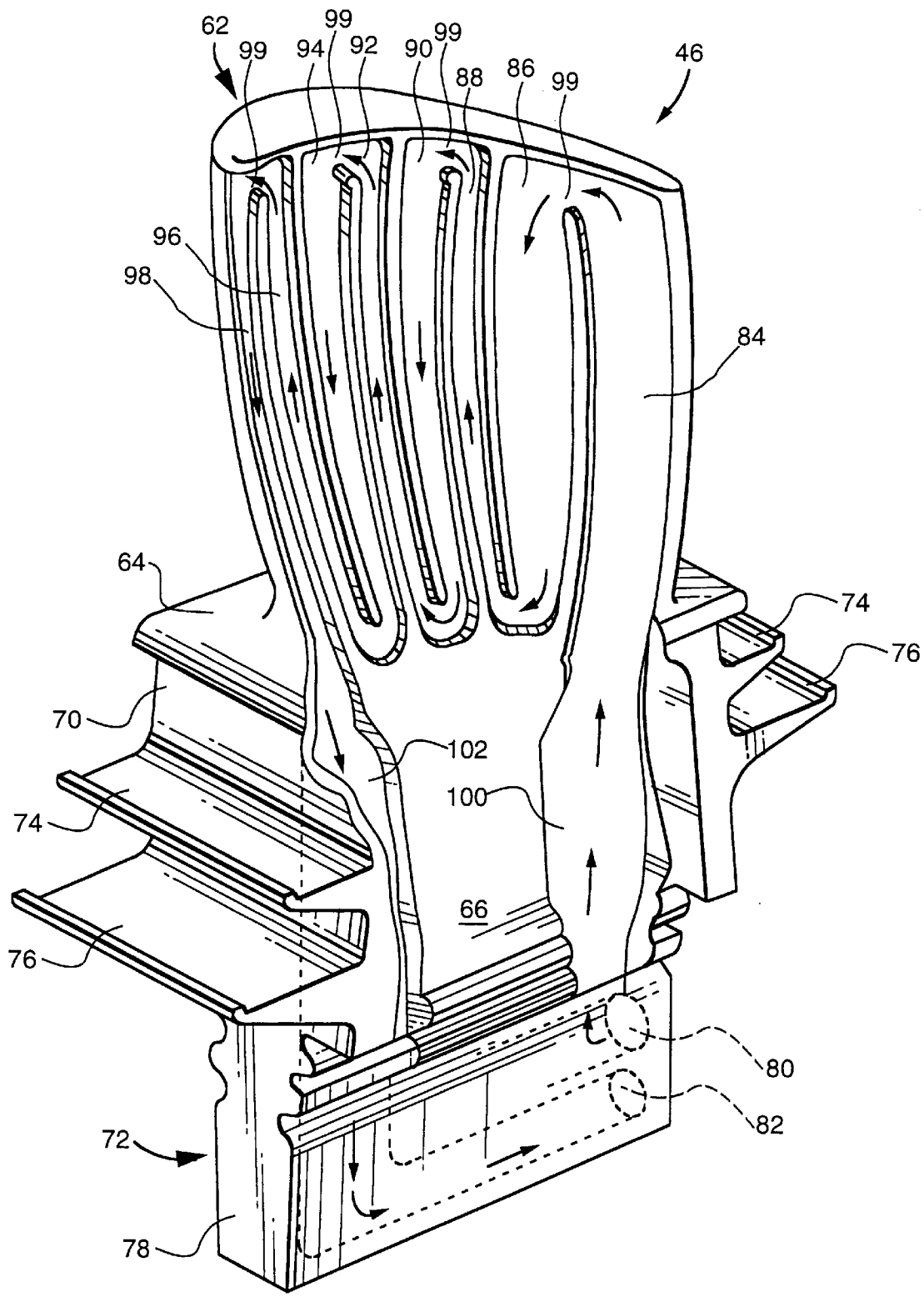
FIG. 5 is a perspective view similar to FIG. 4 but partially cut-away to show internal cooling passages.

FIG. 5 illustrates in simplified form the internal cooling passages in turbine blade 46. Cooling flow entering turbine blade 46 via passage 80 flows through a single, closed serpentine circuit having a nominal total of eight radially extending passages 84, 86, 88, 90, 92, 94, 96, and 98 connected sequentially by 180° return U-bends 99. Flow continues through shank 66 via radial inflow passage 98 which communicates with an axially arranged exit conduit 82. Outflow passage 84 communicates with inlet passage 80 via passage 100, while inflow passage 98 communicates with exit passage 82 via radial passage 102. The total number of radial passages may vary with specific design criteria. As the cooling medium, for example steam, flows along passageways 86, 88, 90, 92, 94, 96 and 98, it convectively cools the portions of turbine blade 46 adjacent these passageways.

Figure 6:
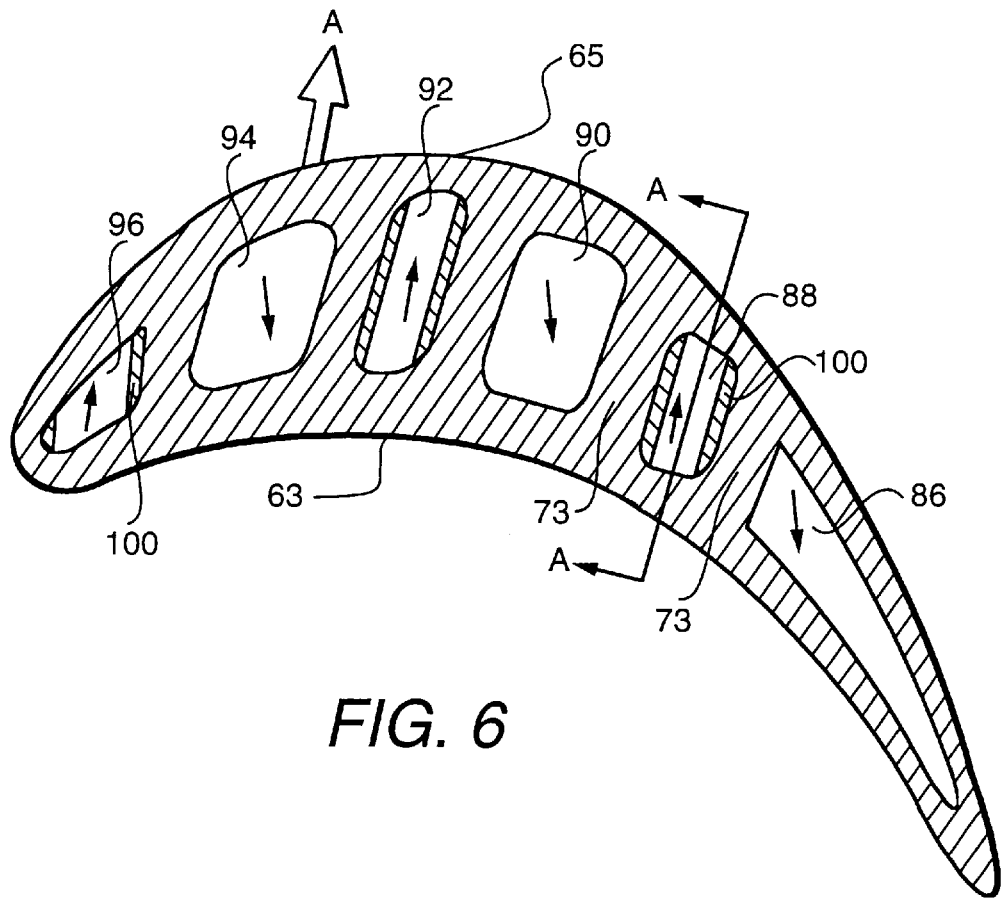
FIG. 6 is a section through a turbine blade with internal cooling passages in accordance with the instant invention.

In accordance with the instant invention, FIG. 6 shows a portion of blade 46 having internal cooling passages. Internal cooling passages are defined by suction side wall 65, pressure side wall 63, and partition side walls 73. A plurality of mixing ribs 100 are disposed along partition side walls 73 of the radial outflow internal cooling passages (88, 92, 96).

Mixing ribs 100 enhance the thermal mixing of the cooling medium, especially the mixing in the circumferential direction between suction side wall 65 and pressure side wall 63, so as to avoid the excessive presence of high temperature cooling medium adjacent suction side wall 65. The presence of high temperature cooling medium adjacent suction side wall 65 is otherwise responsible for a large decrease in thermal performance within a broad range of Buoyancy numbers, such as Buoyancy numbers in the range between about 0.1 to about 1.0.

Figure 7:
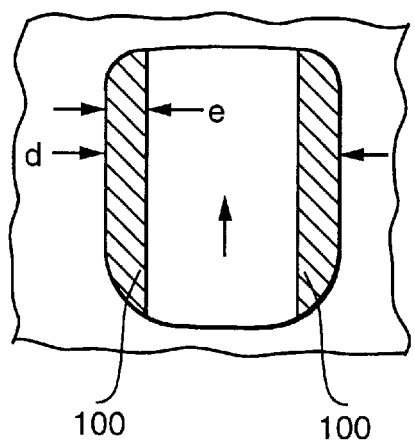
FIG. 7 is an enlarged, planar representation of a flow passage as shown in FIG. 6 in accordance with the instant invention.

FIG. 7 is an enlarged depiction of a radial outflow passage including mixing ribs 100. As shown, the thickness (e) of mixing ribs 100 may be varied for best performance, typically depending upon the overall diameter (d) of cooling passage. Typically, for best performance, thickness (e) is in the range between about 0.1d to about 0.3d. In one embodiment, thickness (e) is in the range between about 0.1 cm (0.039 in.) to about 0.3 cm (0.118 in.).

Figure 8:
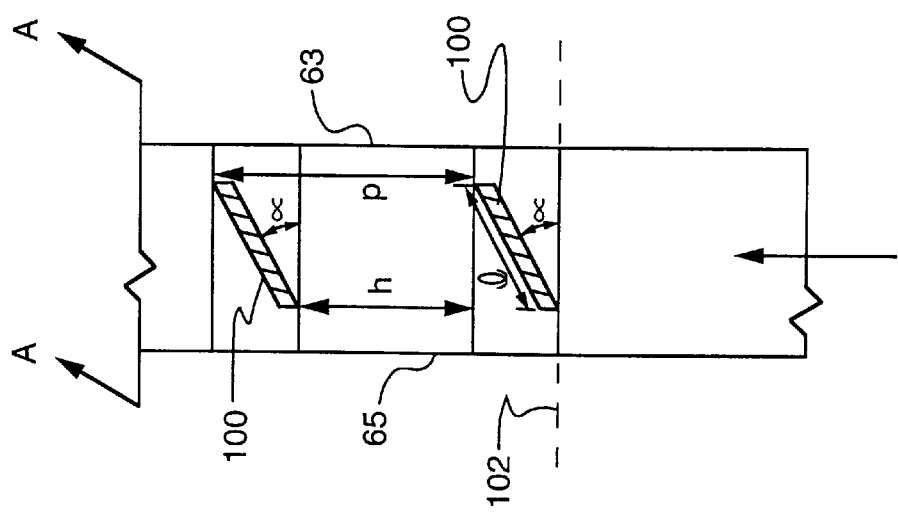
FIG. 8 is a partial cutaway view of an internal cooling passage taken along section A—A of FIG. 6 in accordance with the instant invention.

FIG. 8 is a partial cutaway view of internal cooling passage 88 taken along section A—A of FIG. 6. As shown, in one embodiment, mixing ribs 100 are disposed on partition side walls 73 at an angle ($\alpha$) relative to a reference axis 102. In one embodiment, reference axis 102 is a substantially perpendicular axis extending between suction side wall 65 and pressure side wall 63, as shown in FIG. 8. Typically, angle ($\alpha$) is in the range between about ±25° to about ±75°. In an alternative embodiment, angle ($\alpha$) is in the range between 0° and ±10°.

As shown in FIG. 8, a respective mixing rib 100 within a respective radial outflow cooling channel is typically disposed at a distance (p) from an adjacent mixing rib 100. Distance (p), as used herein, is defined as the distance measured from a point of one mixing rib 100 closest to tip portion 71 of blade 46 to a point of an adjacent mixing rib 100 closest to the tip portion 71 of blade 46 (See FIG. 8). Actual height (h), as used herein is defined as the actual distance between the closest points of adjacent mixing ribs 100 (See FIG. 8). In one embodiment of the instant invention, the actual height (h) between adjacent mixing ribs is in the range between about 0.1p to about 0.2p. In one embodiment, distance (p) is in the range between about 1.016 cm (0.4 in.) to about 3.81 cm (1.5 in.).

In another embodiment, mixing ribs 100 have a thickness (e) (FIG. 7) of about 1.02 cm (0.44 in.) to about 3.81 cm (1.5 in.), a length (l) of about 1.68 cm (0.66 in.), are disposed at an angle ($\alpha$) of about 45° with respect to reference axis 102 and are spaced at a distance (p) of about 1.524 cm (0.6 in.) from one another.

Figure 9:
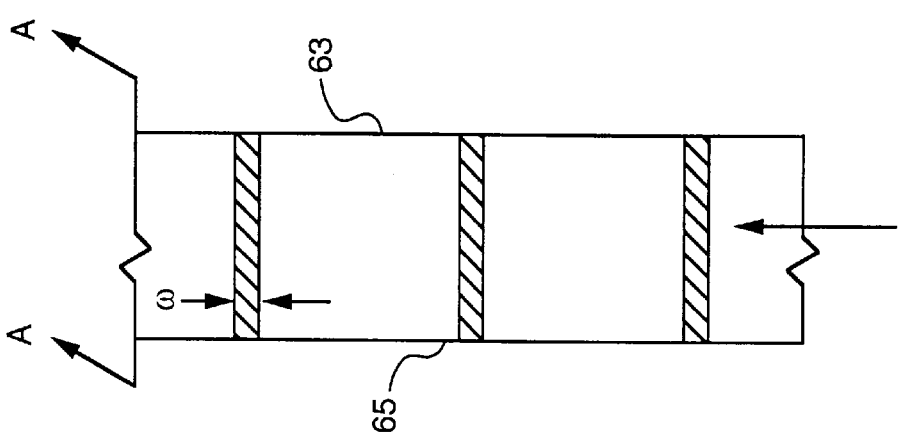
FIG. 9 is a partial cutaway view of an internal cooling passage taken along section A—A of FIG. 6 in accordance with another embodiment of the instant invention.

In accordance with one embodiment of the instant invention, FIG. 9 depicts a plurality of mixing ribs 100 that extend from pressure side wall 63 to suction side wall 65 where the angle ($\alpha$) with respect to reference axis is about 0°. In one embodiment, mixing ribs 100 comprise a substantially constant width (w) that thickness (e) (FIG. 7) and extend from trailing side wall 28 to leading side wall 26. Width (w) is dependent upon the overall size of blade 46. In one embodiment, Width (w) is in the range between about 0.013 cm (0.005 in.) to about 0.635 cm (0.250 in.).

Figure 10:
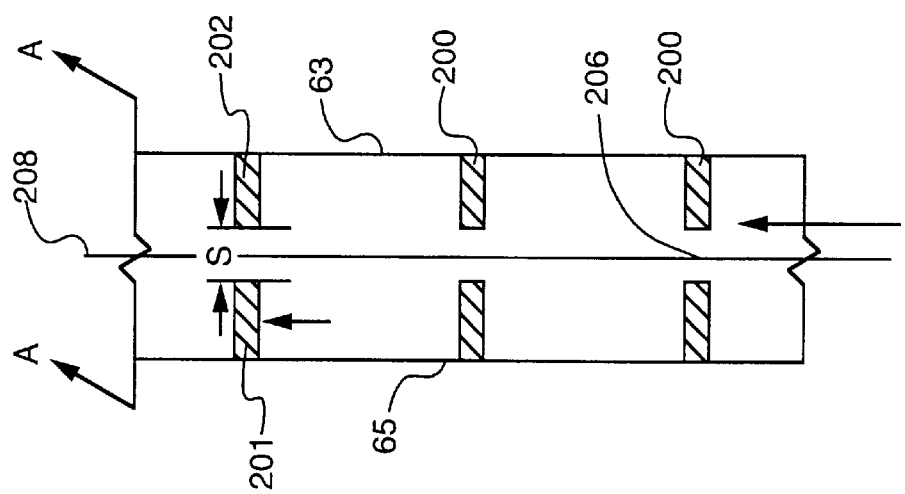
FIG. 10 is a partial cutaway view of an internal cooling passage taken along section A—A of FIG. 6 in accordance with another embodiment of the instant invention.

In accordance with another embodiment of the instant invention, FIG. 10 depicts a plurality of mixing ribs 200. Mixing ribs 200 comprise a pair of truncated rib sections 201 and 202 that each partially extend in the radial direction from suction side wall 65 and pressure side wall 63, respectively, towards a longitudinal centerline 208, thereby defining a gap 206 therebetween. Gap 206 is typically disposed so as to be symmetrically aligned about longitudinal centerline 208 with a width defined by a distance (s) between first and second truncated rib sections 201, 202. Gap 206 enhances the manufacturability of turbine blades that include mixing ribs 200 and reduces the pressure drop within radial outflow passages containing mixing ribs 200. In one embodiment, the distance (s) between first rib section 201 and second rib section 202 is in the range between about 0.254 cm (0.1 in.) to about 0.508 cm (0.2 in.).

Figure 11:
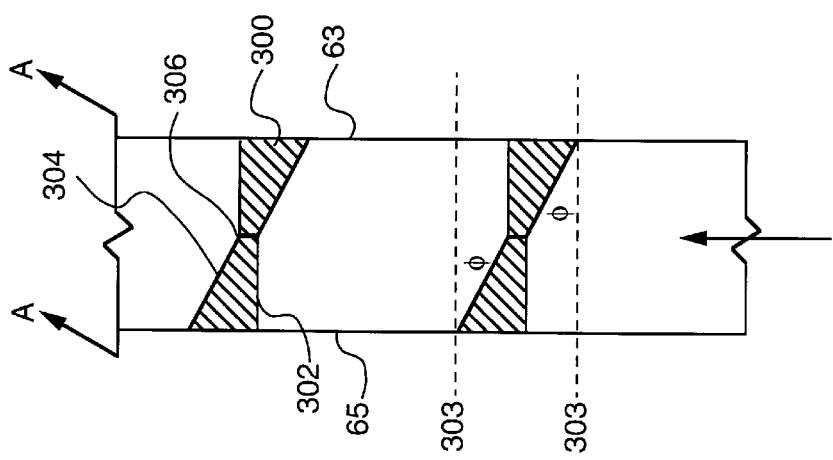
FIG. 11 is a partial cutaway view of an internal cooling passage taken along section A—A of FIG. 6 in accordance with another embodiment of the instant invention.

In accordance with another embodiment of the instant invention, FIG. 11 depicts a plurality of castable mixing ribs 300. Castable mixing ribs 300 are shaped so as to create improved flow characteristics within radial out flow passages while maintaining relatively simplistic casting characteristics. In one embodiment, castable mixing ribs 300 comprise a first surface 302, a second surface 304 and an adjoining edge 306 that define a cross-section of castable mixing ribs 300. First surface 302 is typically aligned in a substantially perpendicular relationship to suction side wall or pressure side wall. Second edge 304 is typically aligned at an angle $\phi$ with respect to reference axis 303. Angle $\phi$ is typically in the range between about ±25° to about ±75°. In one embodiment, first edge 302 has a length of about 0.86 cm (0.34 in.), adjoining edge 306 is about 0.813 cm (0.32 in.) and $\phi$ is about 45°. In another embodiment, a pair of opposing castable mixing ribs 300 are aligned such that the respective adjoining edge 306 of each rib abut against one another in a location centrally located within the radial passage. In another embodiment, a pair of opposing castable mixing ribs 300 are aligned such that the adjoining edge 306 of each rib abut against one another in a location centrally located within the radial passage and the respective ribs are inverted with respect to one another. As used herein, the term "inverted" means that a respective mixing rib 300 is disposed upside down in relationship to each adjacent mixing rib 300, as shown in FIG. 11.

Figure 12:
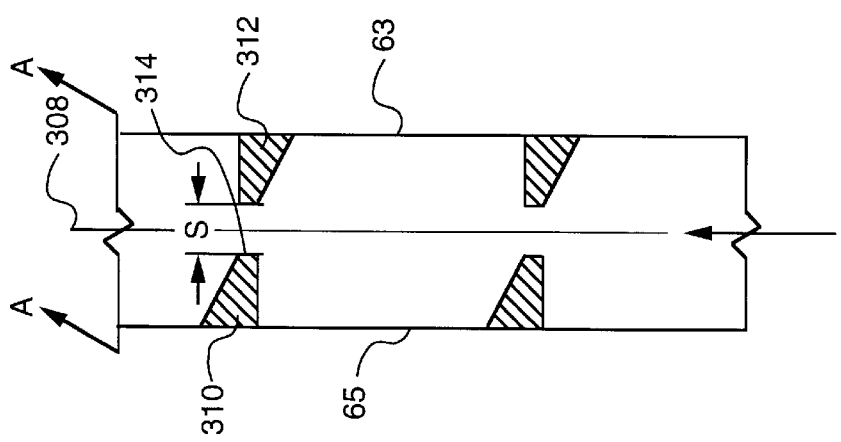
FIG. 12 is a partial cutaway view of an internal cooling passage taken along section A—A of FIG. 6 in accordance with another embodiment of the instant invention.

In another embodiment, as shown in FIG. 12, a pair of opposing truncated castable rib sections 310, 312 are aligned such that the respective adjoining edges 314 are spaced at a distance (s) from one another so as to define a gap 306 therebetween. Gap 306 is typically disposed so as to be symmetrically aligned about a longitudinal centerline 308.

Figure 13:
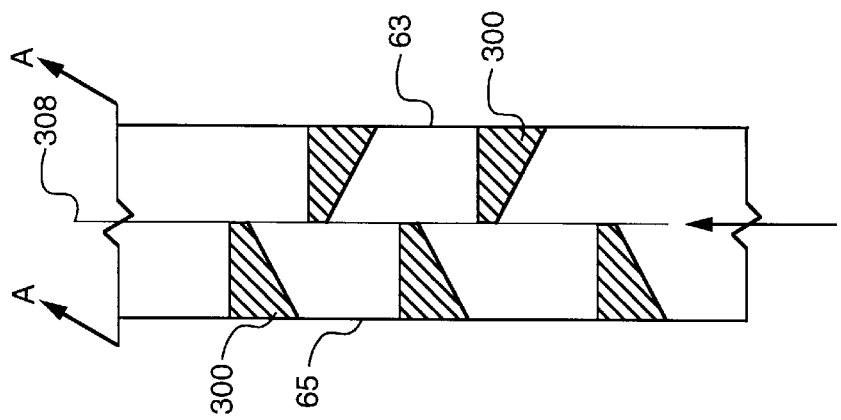
FIG. 13 is a partial cutaway view of an internal cooling passage taken along section A—A of FIG. 6 in accordance with another embodiment of the instant invention.

In another embodiment, as shown in FIG. 13, castable mixing ribs 300 are axially staggered with respect to one another. As used herein, the term "staggered" means that mixing ribs 300 are alternatively disposed on respective sidewalls in an axial direction, as shown in FIG. 13.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A turbine blade comprising:

a shank portion, a tip portion and an airfoil;

said airfoil having a pressure side wall and a suction side wall interconnected by a plurality of partition sidewalls so as to define an internal cooling passageway within said airfoil;

said internal cooling passageway comprising at least one radial outflow passageway to direct a cooling medium flow from said shank portion towards said tip portion and at least one radial inflow passageway to direct a cooling medium flow from said tip portion towards said shank portion; and a plurality of mixing ribs disposed on at least one of said partition sidewalls within said radial outflow passageways so as to enhance the thermal mixing of said cooling medium flow thereby producing improved heat transfer over a range of the Buoyancy number, between about 0.1 to about 1.0.

2. A turbine blade in accordance with claim 1, wherein said mixing ribs extend from said pressure side wall to said suction side wall and the angle with respect to a reference axis is 0°.

3. A turbine blade in accordance with claim 1, wherein said mixing ribs are disposed at an angle in the range between about 0° to about ±10° relative to a reference axis extending between said pressure side wall and said suction side wall.

4. A turbine blade in accordance with claim 1, wherein said mixing ribs are disposed at a distance (p) from one another in the range between about 0.4 in. to about 1.5 in.

5. A turbine blade in accordance with claim 1, wherein said mixing ribs have a thickness (e) in the range between about 0.1 to about 0.3 times the diameter (d) of a respective cooling passageway.

6. A turbine blade in accordance with claim 1, wherein said mixing ribs have a thickness (e) in the range between about 0.1 cm to about 0.3 cm.

7. A turbine blade in accordance with claim 1, wherein said mixing ribs comprise a substantially constant width and thickness.

8. A turbine blade in accordance with claim 1, wherein said mixing ribs comprise a width in the range between about 0.005 in. to about 0.250 in.

9. A turbine blade in accordance with claim 1, wherein said mixing ribs comprise a pair of truncated rib sections, each of said sections partially extending in the radial direction from said pressure side wall and said suction side wall, respectively, so as to define a gap therebetween.

10. A turbine blade in accordance with claim 9, wherein said gap is symmetrically aligned about a longitudinal centerline.

11. A turbine blade in accordance with claim 9, wherein said gap is in the range between about 0.1 in. to about 0.2 in.

12. A turbine blade in accordance with claim 1, wherein said mixing ribs comprise castable mixing ribs having a first surface, a second surface and an adjoining surface so as to define a triangular-shaped cross section.

13. A turbine blade in accordance with claim 12, wherein at least one pair of opposing castable mixing ribs are aligned such that said respective adjoining edges abut against one another.

14. A turbine blade in accordance with claim 13, wherein said opposing castable mixing ribs are inverted with respect to one another.

15. A turbine blade in accordance with claim 13, wherein said castable mixing ribs comprise a pair of truncated castable rib sections aligned such that said respective adjoining edges are in a spaced relation with each other so as to define a gap therebetween.

16. A turbine blade in accordance with claim 1, wherein said mixing ribs are staggered with respect to one another.

17. A turbine engine used for power generation comprising at least one turbine blade, said turbine blade comprising:

a shank portion, a tip portion and an airfoil;

said airfoil having a pressure side wall and a suction side wall interconnected by a plurality of partition sidewalls so as to define an internal cooling passageway within said airfoil;

said internal cooling passageway comprising at least one radial inflow passageway to direct a cooling medium flow from said shank portion towards said tip portion and at least one radial outflow passageway to direct a cooling medium flow from said tip portion towards said shank portion; and a plurality of mixing ribs disposed on at least one of said partition sidewalls within said radial outflow passageways so as to enhance the thermal mixing of said cooling medium flow thereby producing improved heat transfer over a range of the Buoyancy number between about 0.1 to about 1.0.

* * * * *